No. 820,807. PATENTED MAY 15, 1906.
F. G. MARBACH.
MICROMETER CALIPERS.
APPLICATION FILED JAN. 16, 1905.
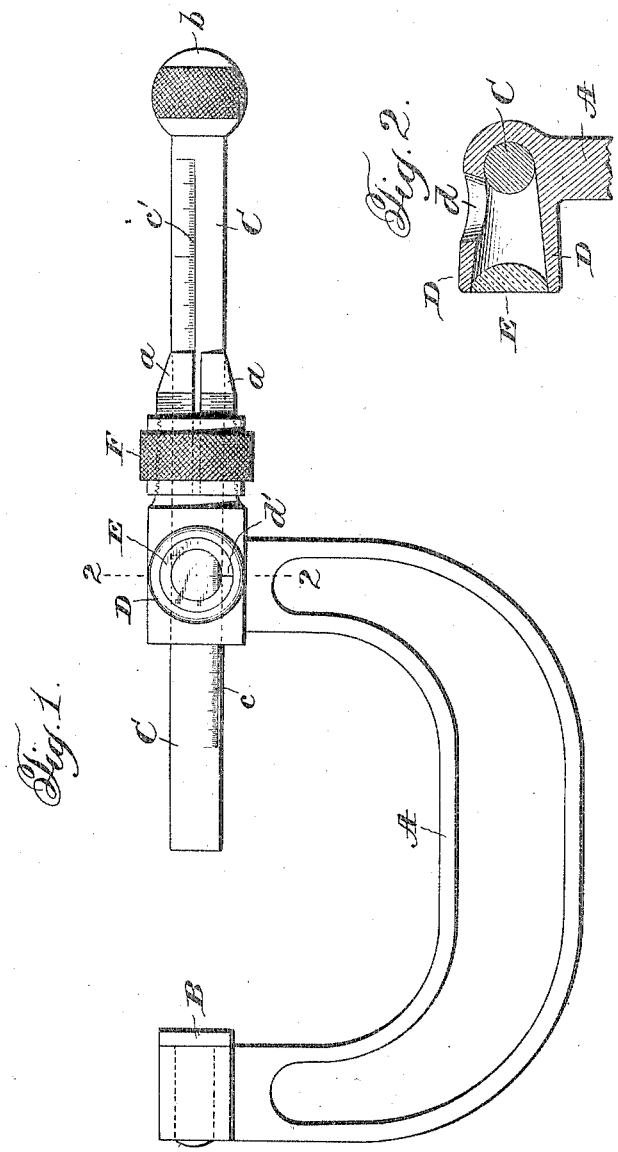
Witnesses:
Jas E Hutchinson
J. L. Lawlor
Inventor:
Frank G. Marbach,
by Prindle and Williamson,
Attorneys.

UNITED STATES PATENT OFFICE.

FRANK G. MARBACH, OF MEDINA, OHIO.

MICROMETER-CALIPERS.

No. 820,807.  Specification of Letters Patent.  Patented May 15, 1906.

Application filed January 16, 1905. Serial No. 241,270.

*To all whom it may concern:*

Be it known that I, FRANK G. MARBACH, of Medina, in the county of Medina, and in the State of Ohio, have invented a certain new and useful Improvement in Micrometer-Calipers; and I do hereby declare that the following is a full, clear, and exact description thereof, reference being had to the accompanying drawings, in which—

Figure 1 is a side elevation of a caliper or gage embodying my invention, and Fig. 2 is a cross-section on the line 2 2 of Fig. 1.

The object of my invention is to provide a construction of micrometer caliper or gage which may be used for quick and accurate reading, and to this end my invention consists in the caliper or gage constructed substantially as hereinafter specified and claimed.

In the embodiment of my invention which I have selected for illustration the caliper has a U-shaped frame A, one arm of which carries the anvil B and the other arm of which supports the measuring rod or post C, which is round in cross-section and is slidably mounted in an opening in its supporting-arm, which of course alines with the anvil B. Extending at right angles from the hub or boss of the arm that supports the measuring rod or post is a lug D, which has a tapering cavity that extends deep enough to expose the measuring-post and graduations $c$ thereon, and in the outer end of the cavity of said boss is mounted a magnifying glass or lens E, so that looking through the glass the graduations $c$ on the measuring-post C will be magnified, so as to be easily and quickly read. A light-hole $d$ is provided in the lug D below the glass. The lug D has on its inner surface an index or reading-line $d'$ for the graduations $c$. The graduations $c$ may be hundredths of an inch, and it will therefore be seen that by the use of the magnifying-glass very fine graduations may be employed, which will enable exceedingly close measurements to be accurately made. By mounting the glass upon the stationary frame it will be seen that the position of the glass with reference to the reading-point is not changed, so that the operation of reading the indication may be most readily and quickly done, and there is no projection or protrusion of the glass-support to an extent to make it awkward to handle the instrument or likely that the glass will be struck against objects in the use of the instrument.

Besides the fine measurements which are possible because of the use of the magnifying-glass, I provide for using the instrument for coarser measurements, and for this purpose I place upon the measuring rod or post C a scale $c'$ of coarser graduations—say sixty-fourths of an inch—the index or reading-point for which is at the end of a tubular extension $a$ of the frame hub or boss which supports the measuring-post. To hold the measuring-post in any position, a holding or clamping means is provided, which, as shown, consists of a thumb-nut F, having a tapering bore which engages thread on the exterior of the tubular extension $a$, which latter is split longitudinally, so that the nut may compress it and bind it against the measuring-post when the nut is turned in one direction. On the outer end of the measuring-post is a knurled head $b$, by which the post may be moved longitudinally in taking a measurement and by which it may be rotated to bring one or the other of the scales in position for reading.

It will be seen that by my invention I provide a caliper by means of which measurements can be most quickly made and measurements of the finest description made with accuracy.

It is to be understood that though the construction which I have illustrated and described is a very satisfactory one in its details nevertheless I do not limit myself to such precise construction.

Having thus described my invention, what I claim is—

1. A caliper or gage, comprising a frame having an arm with an opening, a measuring-post having graduations on its surface passing through said opening, said arm having a cavity wholly within the limits thereof that intersects the opening through which the measuring-post passes, through which cavity graduations of the measuring-post are visible, and a magnifying-glass in said cavity; and fitting the same, so that the inner surface of the glass is housed.

2. A caliper or gage, comprising a frame having an arm, a measuring-post longitudinally movable in an opening through said arm, a boss integral with said arm and having a cavity that intersects the opening through which the measuring-post passes, and having a light-admitting opening, and a glass mounted in said cavity.

In testimony that I claim the foregoing I have hereunto set my hand.

FRANK G. MARBACH.

Witnesses:
FRANK SPELLMAN,
ERNEST R. ROOT.